UNITED STATES PATENT OFFICE.

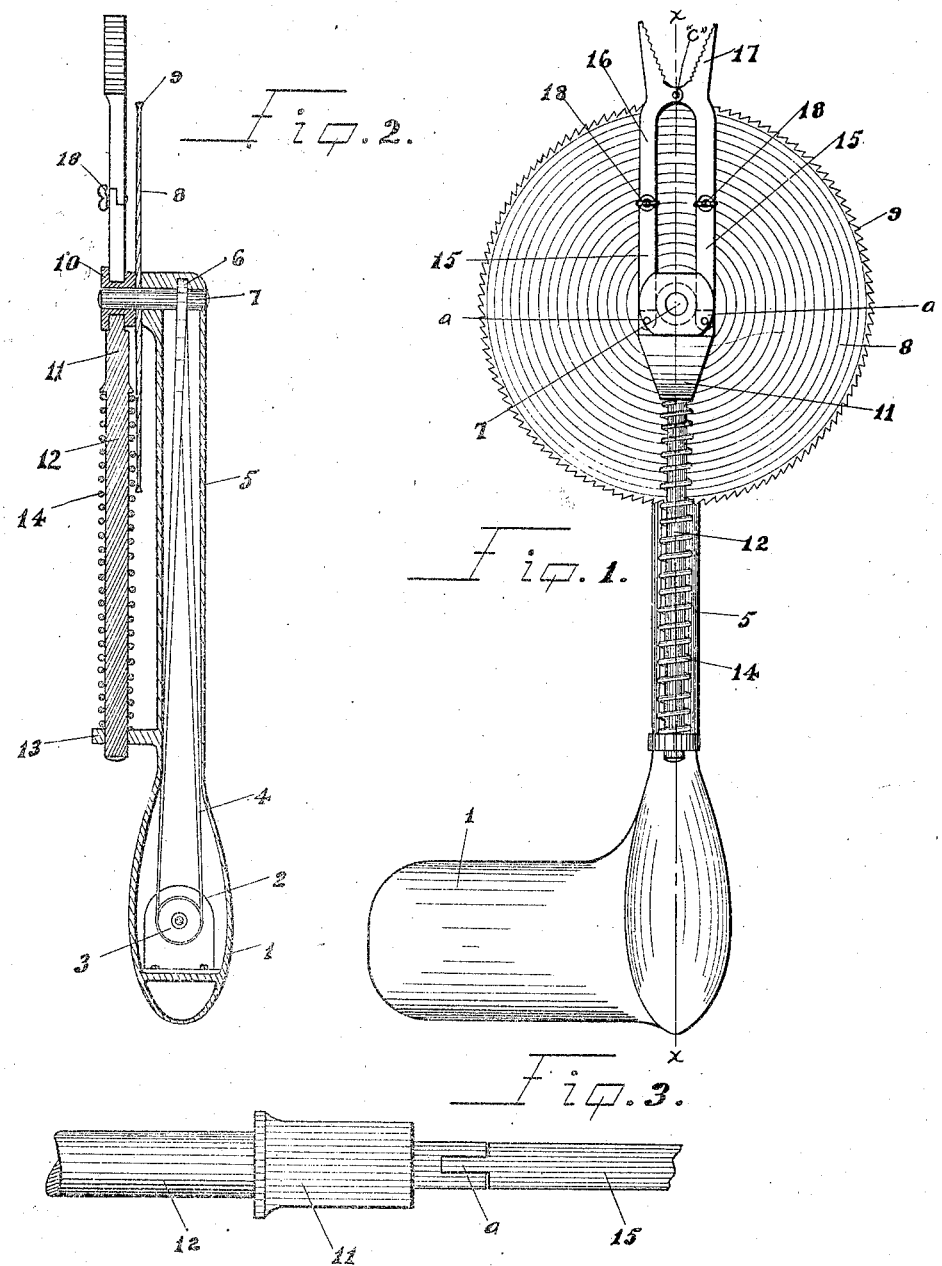

AUGUST MEYER, OF OAKLAND, CALIFORNIA.

BONE-SAW.

967,805.

Specification of Letters Patent.    Patented Aug. 16, 1910.

Application filed August 25, 1909. Serial No. 514,528.

*To all whom it may concern:*

Be it known that I, AUGUST MEYER, a citizen of the United States, residing at Oakland, in the county of Alameda and State of California, have invented certain new and useful Improvements in Bone-Saws; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in saws and particularly to that class of hand saws known as bone saws, the object of the invention being to produce a bone hand saw which will be power operated which will permit the sawing to be done easier, quicker and cleaner than can be done with saws which are operated manually.

A further object of the invention is to produce a simple and inexpensive tool and yet one which will be exceedingly effective for the purposes for which it is devised.

These objects I accomplish by such structure and relative arrangement of parts as will fully appear by a perusal of the following specification and claims.

In the drawings similar characters of reference indicate corresponding parts in the several views.

Figure 1 is a side elevation of the complete tool. Fig. 2 is a sectional view taken on a line *x—x* of Fig. 1. Fig. 3 is a fragmentary view of a guard connection.

Referring now more particularly to the characters of reference on the drawings 1 designates a hollow handle member carrying an electric motor 2 having a drive pulley 3, a belt 4 extending from said pulley 3 through a hollow projecting arm 5 and driving a pulley 6 secured to a shaft 7 journaled in the outer end of said arm, such shaft carrying a circular saw 8 having teeth 9 of a greater width than the body of the saw.

On the outer end of the shaft 7 is a flanged collar 10 having abutted normally against it a block 11 of a rod 12 movable in an orificed flange 13 on the handle 5, there being a spring 14 interposed between said member 13 and said member 11.

Pivotally mounted on the member 11 as at "*a*" and projecting outwardly therefrom are guard members comprising lower members 15 pivoted to upper members 16 at "*b*" and such upper members being pivoted together at "*c*" forming jaws 17.

In practice by means of the pivotal connections "*a*", "*b*" and "*c*" the jaw members 17 are clamped onto the object to be sawed and fixed in such position by means of a wing nut 18 and the advancement of the saw is permitted by the flange 13 advancing against and compressing the spring 14, such spring returning the collar 10 to its normal position against the member 11 after the sawing operation is complete, the jaws 17 holding the device steady and true during operation thus permitting a quick, easy and clean cut to be made. The structure of the teeth as at 9 permits, I have found, a more efficient action of the saw.

This saw can be used readily where any hand saw work is required, by changing the saw to suit the different purposes.

From the foregoing description it can be readily seen that I have produced such a hand saw as readily fulfils the objects of the invention as set forth herein.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A hand saw comprising a casing, a shaft in said casing, a saw on said shaft, a guide on said shaft, a guard movable on said guide longitudinally with respect to said casing and a resilient means maintaining the normal position of said guard.

2. A hand saw comprising a casing, a power operated saw on said casing, a guard movable longitudinally of said casing, said guard comprising pairs of lower and upper members pivotally joined at their adjacent ends, the upper members being pivotally joined at their extremities and means for fixing said guard members in rigid position.

3. A hand saw comprising a casing, a power driven saw thereon, a guide on said casing, a guard movable in said guide, a block on said guard normally seating against said guide, a rod on said block, an orificed flange on said casing, said rod being movable through said orifice, and a spring interposed between said block and said flange.

In testimony whereof I affix my signature in presence of two witnesses.

AUGUST MEYER.

Witnesses:
S. G. BRITTAN,
J. H. JOHNSON.